US011369008B2

(12) United States Patent
Bethel

(10) Patent No.: US 11,369,008 B2
(45) Date of Patent: Jun. 21, 2022

(54) HEATING DEVICE FOR SPRAY BOTTLES

(71) Applicant: Shadonna Bethel, Richmond, VA (US)

(72) Inventor: Shadonna Bethel, Richmond, VA (US)

(\*) Notice: Subject to any disclaimer, the term of this patent is extended or adjusted under 35 U.S.C. 154(b) by 237 days.

(21) Appl. No.: 16/186,779

(22) Filed: Nov. 12, 2018

(65) Prior Publication Data
US 2019/0082502 A1 Mar. 14, 2019

Related U.S. Application Data

(63) Continuation-in-part of application No. 14/830,209, filed on Aug. 19, 2015, now abandoned.

(60) Provisional application No. 62/065,878, filed on Oct. 20, 2014.

(51) Int. Cl.
*H05B 3/68* (2006.01)
*A47J 27/21* (2006.01)
*A47J 36/24* (2006.01)

(52) U.S. Cl.
CPC .............. *H05B 3/685* (2013.01); *A47J 27/21* (2013.01); *A47J 36/24* (2013.01)

(58) Field of Classification Search
CPC .. A47J 27/21; A47J 27/21008; A47J 27/2105; A47J 36/24; A47J 36/2433; A47J 36/2444; A47J 36/2461; A47J 36/2466; A47J 36/2472; A47J 36/2483; H05B 3/683–686
USPC .............. 219/386, 429–442, 449.1
See application file for complete search history.

(56) References Cited

U.S. PATENT DOCUMENTS

| | | | |
|---|---|---|---|
| 1,062,344 A * | 5/1913 | Mann | A47J 27/004 219/436 |
| 1,869,649 A | 8/1932 | Edwin | |
| 2,306,979 A | 12/1942 | Potsdam | |
| 2,560,214 A * | 7/1951 | Cameron | A47J 31/20 99/319 |
| 2,700,097 A | 1/1955 | Morey | |
| 3,405,899 A * | 10/1968 | Trachtenberg | B60N 3/103 248/229.15 |
| 3,488,473 A * | 1/1970 | Sanders | A47J 36/2466 219/432 |
| 3,896,973 A | 7/1975 | Morgan | |
| 3,915,079 A * | 10/1975 | Balderson | A47J 31/005 99/281 |
| 4,011,992 A | 3/1977 | Olsen | |
| 4,399,351 A | 8/1983 | Koff | |
| 4,523,083 A | 6/1985 | Hamilton | |
| 5,700,991 A | 12/1997 | Osbern | |

(Continued)

*Primary Examiner* — Sang Y Paik
(74) *Attorney, Agent, or Firm* — Boudwin Intellectual Property; Daniel Boudwin

(57) ABSTRACT

A heating device for use in warming the contents of spray bottles. The heating device includes a housing having at least one heating plate on the upper surface thereof. The heating plate includes an electrically operated heating element. The heating plate is controlled by the user via a dial that allows a user to select the temperature of the heating plate. The base of a spray bottle can be positioned directly on the surface of a heating plate so that heat from the heating plate is transferred to the spray bottle in order to warm the contents thereof. The spray bottle is preferably composed of a heat resistant material so that the spray bottle will not degrade or melt upon heating. The housing of the heating device may include one or more storage compartments therein for use in storing various items therein.

15 Claims, 6 Drawing Sheets

(56) References Cited

U.S. PATENT DOCUMENTS

| | | | |
|---|---|---|---|
| 5,786,573 A | 7/1998 | Fabrikant et al. | |
| 5,960,998 A * | 10/1999 | Brown | B05B 11/0005 |
| | | | 222/131 |
| 5,990,456 A * | 11/1999 | Kilbride | A47J 36/34 |
| | | | 219/432 |
| 6,072,161 A * | 6/2000 | Stein | A47G 19/2288 |
| | | | 219/386 |
| 6,310,329 B1 | 10/2001 | Carter | |
| 6,670,583 B2 * | 12/2003 | Kara | A47J 36/2472 |
| | | | 219/432 |
| 8,334,780 B1 * | 12/2012 | Mendoza, Jr. | A47J 41/0094 |
| | | | 340/584 |
| 8,344,290 B1 | 1/2013 | Hinton et al. | |
| 9,485,811 B1 | 11/2016 | Sansom | |
| 2011/0072978 A1 | 3/2011 | Popescu | |
| 2015/0327707 A1 * | 11/2015 | Son | H05B 6/04 |
| | | | 219/621 |

* cited by examiner

HEATING DEVICE FOR SPRAY BOTTLES

CROSS REFERENCE TO RELATED APPLICATIONS

This application is a continuation-in-part of U.S. Patent Application Publication No. 2016/0113066 filed on Aug. 19, 2015 which claims the benefit of U.S. Provisional Application No. 62/065,878 filed on Oct. 20, 2014. The above identified patent applications are herein incorporated by reference in their entirety to provide continuity of disclosure.

BACKGROUND OF THE INVENTION

The present invention relates to heating devices. More particularly, the present invention provides a heating device for warming the contents of a spray bottle. The heating device comprises a housing having at least one heating plate thereon, wherein the heating plate is electrically heated, and the temperature thereof is controllable via a dial disposed on the housing. The heating device is adapted to warm the base of a spray bottle placed thereon in order to heat the contents of the spray bottle.

Hairdressers, hairstylists, and barbers often spray water onto a client's hair in order to dampen or wet the client's hair. Hairstylists may find it easier to work with hair that is wet in that the hair can be easier to brush, comb, or cut with scissors. However, many clients find the water in spray bottles to be uncomfortable cold. As a result, the client may have a negative experience or may not feel relaxed as the result of being sprayed with the cold water. Some hairstylists may occasionally refill the spray bottle with warm water, but the water does not remain warm and cools over time. Thus, a heating device for warming the liquid within a spray bottle is desired.

Devices have been disclosed in the known art that relate to heating devices. These include devices that have been patented and published in patent application publications. These devices generally relate to heating devices for bottles or containers.

These known art devices have several known drawbacks. The devices in the known art provide various heating devices for liquids and other substances stored within bottles or containers. However, some devices relate to containers having heating elements integrated therein, and such devices are not suitable for use with conventional bottles or containers. Other devices provide heating devices removably securable to bottles or containers, however, such devices may not be the appropriate size or shape to fit a variety of bottles or containers. Thus, a heating device for use in warming the contents of any sized spray bottle is desired.

In light of the devices disclosed in the known art, it is submitted that the present invention substantially diverges in design elements from the known art and consequently it is clear that there is a need in the art for an improvement to existing heating devices. In this regard, the instant invention substantially fulfills these needs.

SUMMARY OF THE INVENTION

In view of the foregoing disadvantages inherent in the known types of heating devices now present in the known art, the present invention provides a new heating device wherein the same can be utilized for providing convenience for the user when heating the contents of a spray bottle.

It is therefore an object of the present invention to provide a new and improved heating device comprising a housing having at least one heating plate thereon, wherein a spray bottle or similar object is adapted to be positioned directly on the heating plate in order to warm the contents thereof.

It is another object of the present invention to provide a heating device comprising a housing having at least one heating plate thereon, wherein the heating plates include an electric heating element.

Another object of the present invention is to provide a heating device comprising a housing having at least one heating plate thereon, wherein each heating plate is controlled via one or more dials that allow the user to select the temperature of the heating plate.

Another object of the present invention is to provide a heating device that may be readily fabricated from materials that permit relative economy and are commensurate with durability.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
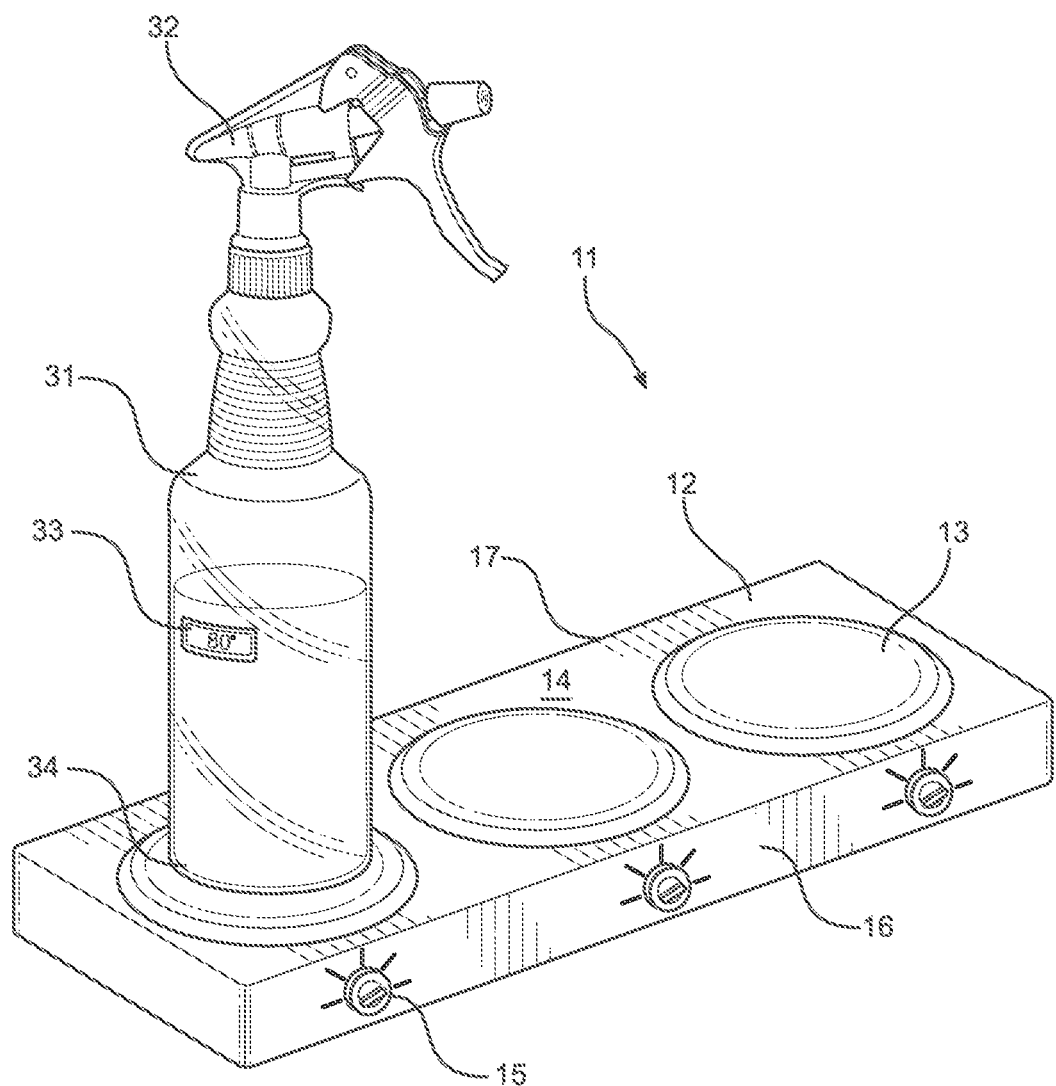
FIG. 1 shows a perspective view of the heating device as used to heat a spray bottle.

Reference is made herein to the attached drawings. Like reference numerals are used throughout the drawings to depict like or similar elements of the heating device. For the purpose of presenting a brief and clear description of the present invention, the preferred embodiment will be discussed as used for heating the contents of a spray bottle. The figures are intended for representative purposes only and should not be considered to be limiting in any respect.

Referring now to FIG. 1, there is shown a perspective view of the heating device as used to heat a spray bottle. The heating device 11 comprises a housing 12 having at least one heating plate 13 thereon. In the illustrated embodiment, the housing 12 comprises a rectangular configuration, however, in alternate embodiments, the housing 12 may have any of various shapes or configurations. The housing 12 includes a planar upper surface 14 such that the surface of each heating plate 13 thereon is also substantially planar. In this way, a spray bottle or similar container can be stably positioned on the heating plate 13.

In the illustrated embodiment, three heating plates 13 are shown wherein the heating plates 13 are arranged in a linear or side-by-side orientation. However, in alternate embodiments, the housing 12 may include fewer or additional heating plates 13. The heating plates 13 preferably comprise a circular configuration so as to be shaped similarly to the cross-sectional area of a spray bottle. A spray bottle or similar object can be placed directly on each heating plate 13 for heating.

The heating plates 13 include an electrical heating element therein. The electrical heating element produces heat when the electrical current passes therethrough. Each heating plate 13 comprises a dial 15 or other similar control for allowing the user to select the temperature of the corresponding heating plate 13. The housing 12 includes a front end 16 and a rear end 17, wherein the dials 15 are located on the front end 16 thereof so that the dials 15 are easily accessible. In this way, the user can increase or decrease the temperature of the heating plate 13 in order to warm the contents of a spray bottle 31 to a desired extent.

In some embodiments, a spray bottle 31 specially adapted for use with the heating device 11 is provided. The spray bottle 31 comprises a container having a hollow interior volume in which liquid can be stored. The container comprises an open upper end, wherein said open upper end removably receives a cap having a spray nozzle 32 thereon. The spray nozzle 32 is adapted to disperse the contents of the container in a fine mist or stream. The spray bottle 31 is preferably composed of a heat-resistant material that will not deform or melt upon exposure to heat. The spray bottle 31 may include a temperature sensor 33 thereon in order to both determine and display the temperature of the contents thereof. Further, in some embodiments, the spray bottle 31 includes a magnetic base 34 that is adapted to be magnetically secured to the heating plate so that the spray bottle 31 is secured to the heating device 11.

Figure 2:
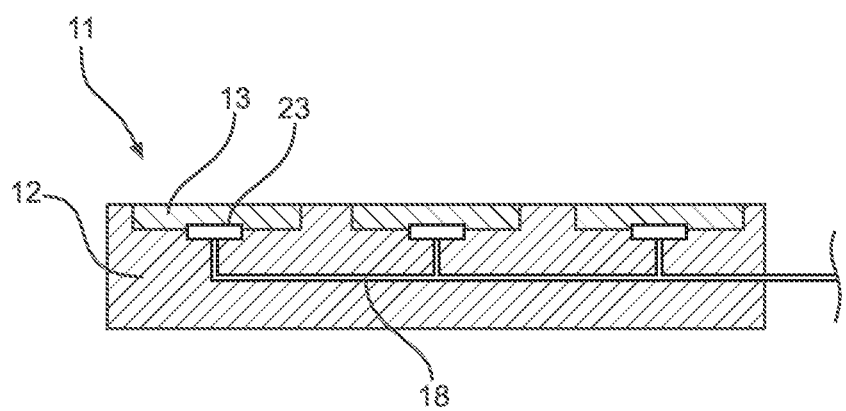
FIG. 2 shows a cross sectional view of the heating device.

Referring now to FIG. 2, there is shown a cross-sectional view of the heating device. The housing 12 comprises at least one heating plate 13, wherein each heating plate 13 includes an electric heating element 23. Each electric heating element 23 is electrically connected via a control circuit 18. The control circuit 18 distributes electricity to the heating elements 13 from a power source, and the control circuit 18 further connects the heating elements to the corresponding dial for controlling the operation of the heating plate 13. The control circuit 18 may further include means for preventing the heating plates 13 from reaching a predetermined temperature maximum in order to prevent the heating plates 13 from overheating.

Figure 3:
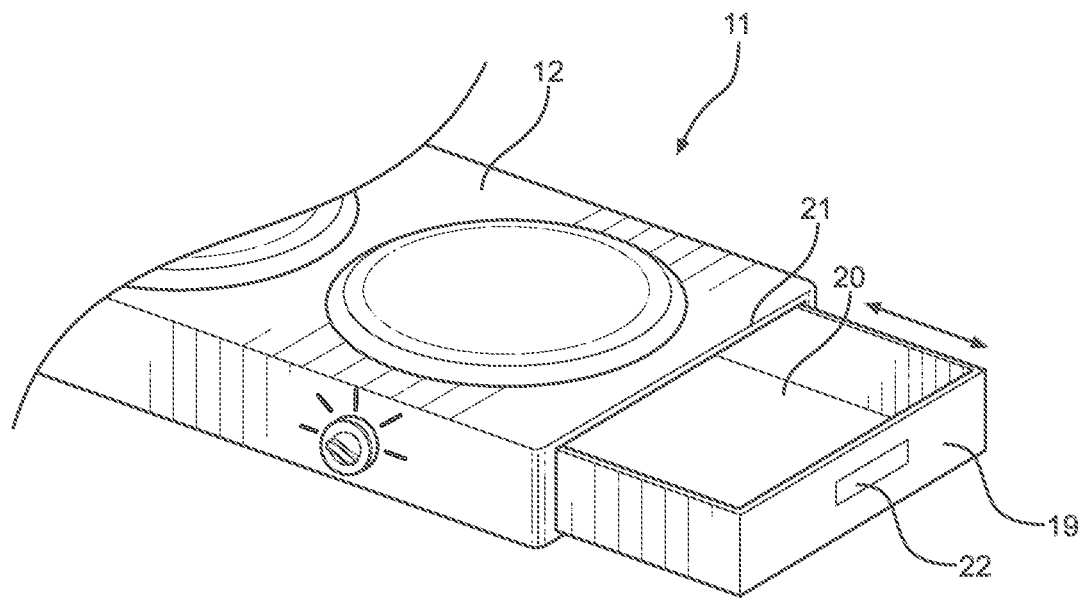
FIG. 3 shows a perspective view of an end of the heating device having a storage compartment thereon.

Referring now to FIG. 3, there is shown a perspective view of an end of the heating device having a storage container thereon. The housing 12 of the heating device 11 further includes one or more storage containers 19. In the illustrated embodiment, the heating device 11 includes a storage container 19 resembling a drawer that is slidably positioned within an end 21 of the housing 12. The storage container 19 can be extended from or retracted into the housing 12 as desired by the user. The storage container 19 includes an interior volume 20 in which any of various tools and items can be positioned for storage. Further, the storage container 19 includes a handle 22 thereon for allowing the user to easily grasp the storage container 19 in order to move the storage container 19 between stored and extended configurations. In the extended position, the user may place a cup or jar on the storage container 19 for use in storing hairstyling tools in an upright orientation.

Figure 4:
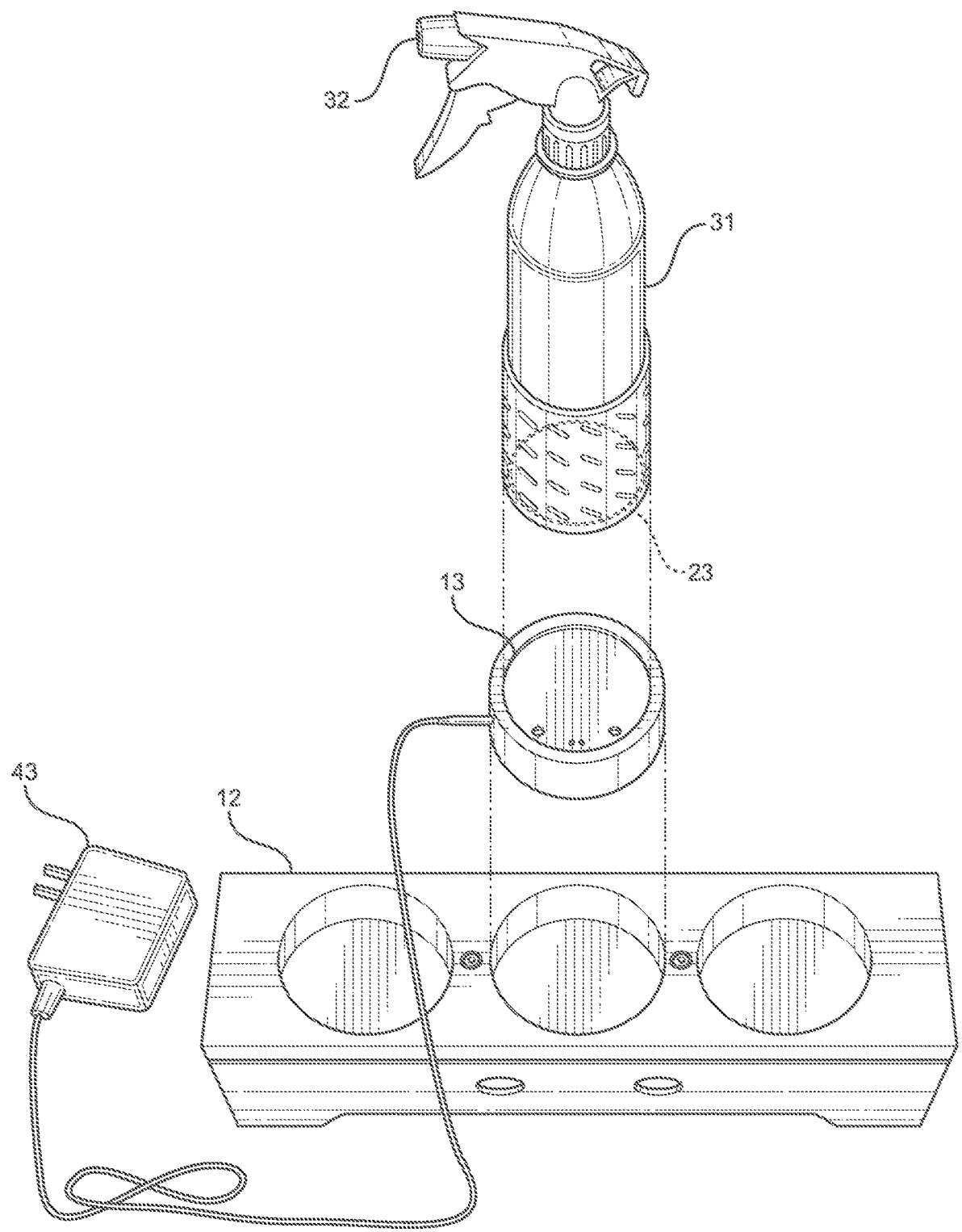
FIG. 4 shows an exploded view of an alternate embodiment of the heating device.

Referring now to FIG. 4, there is shown an exploded view of an alternate embodiment of the heating device. In the illustrated embodiment, the plate 13 is removably securable to the housing 12, such that the user can more easily transport the heating device to a desired location. The spray bottle 31 is configured to rest on the plate 13, such that when a power source 43 is provided to the plate 13, the heating element transfers heat into the interior volume of the spray bottle 31. In this way, the user can dispense liquid heated to a desired temperature through the spray nozzle 32. In the illustrated embodiment, the spray bottle 31 further comprises the heating element therein, such that heat is transferred into the interior volume thereof when the spray bottle 31 receives power from the plate 13. In some embodiments, a heat conductive coating is disposed between the heating element and the interior volume of the spray bottle 31, such that heat is more easily dispersed through the interior volume.

Figure 5:
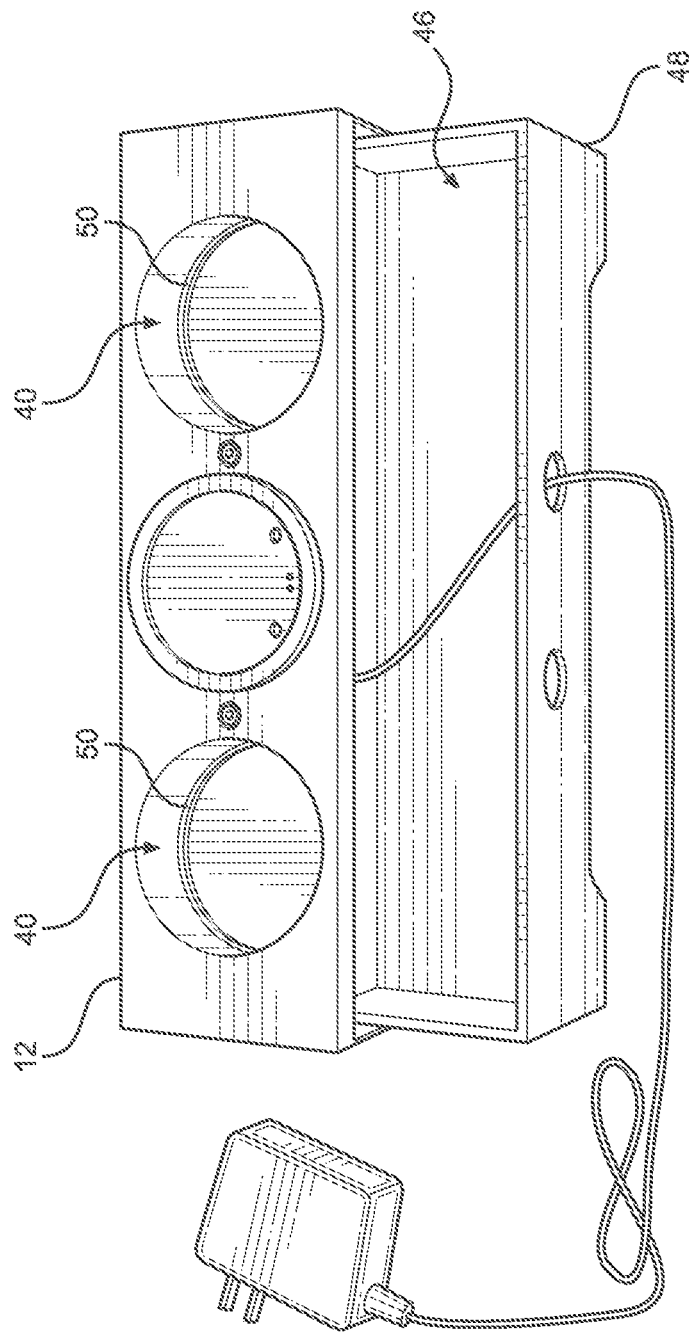
FIG. 5 shows a perspective view of an alternate embodiment of the heating device having a storage compartment in an open position.

Referring now to FIG. 5, there is shown a perspective view of an alternate embodiment of the heating device having a storage compartment in an open position. In the illustrated embodiment, the housing 12 further comprises a plurality of openings 40 therethrough, wherein the plurality of openings 40 are configured to receive the plate therein. In the illustrated embodiment, the plurality of openings 40 are disposed linearly along the longitudinal axis of the housing 12, such that a plurality of spray bottles can be simultaneously heated side-by-side. In some embodiments, the plurality of openings 40 further comprise a lip 50 extending annularly inwardly therefrom, wherein the lip 50 is configured to receive a lower end of each plate thereon, such that the plate is retained in a desired position along the housing 12.

In the illustrated embodiment, the housing 12 comprises a storage container 19 slidably disposed within the front end 16 thereof, such that the housing 12 is configured to selectively move between an extended position and a retracted position. When the storage container 19 is in the retracted position, a front wall 48 of the storage container 19 rests flush with the front end 16. In this way, the housing 12 comprises a smaller form factor for easier transport and storage. Additionally, in the illustrated embodiment, the front wall 48 further comprises a pair of apertures 46 therethrough, wherein the pair of apertures 46 are configured to receive a finger therethrough. In this way, the user can easily move the storage container 19 between the extended and retracted positions.

Figure 6:
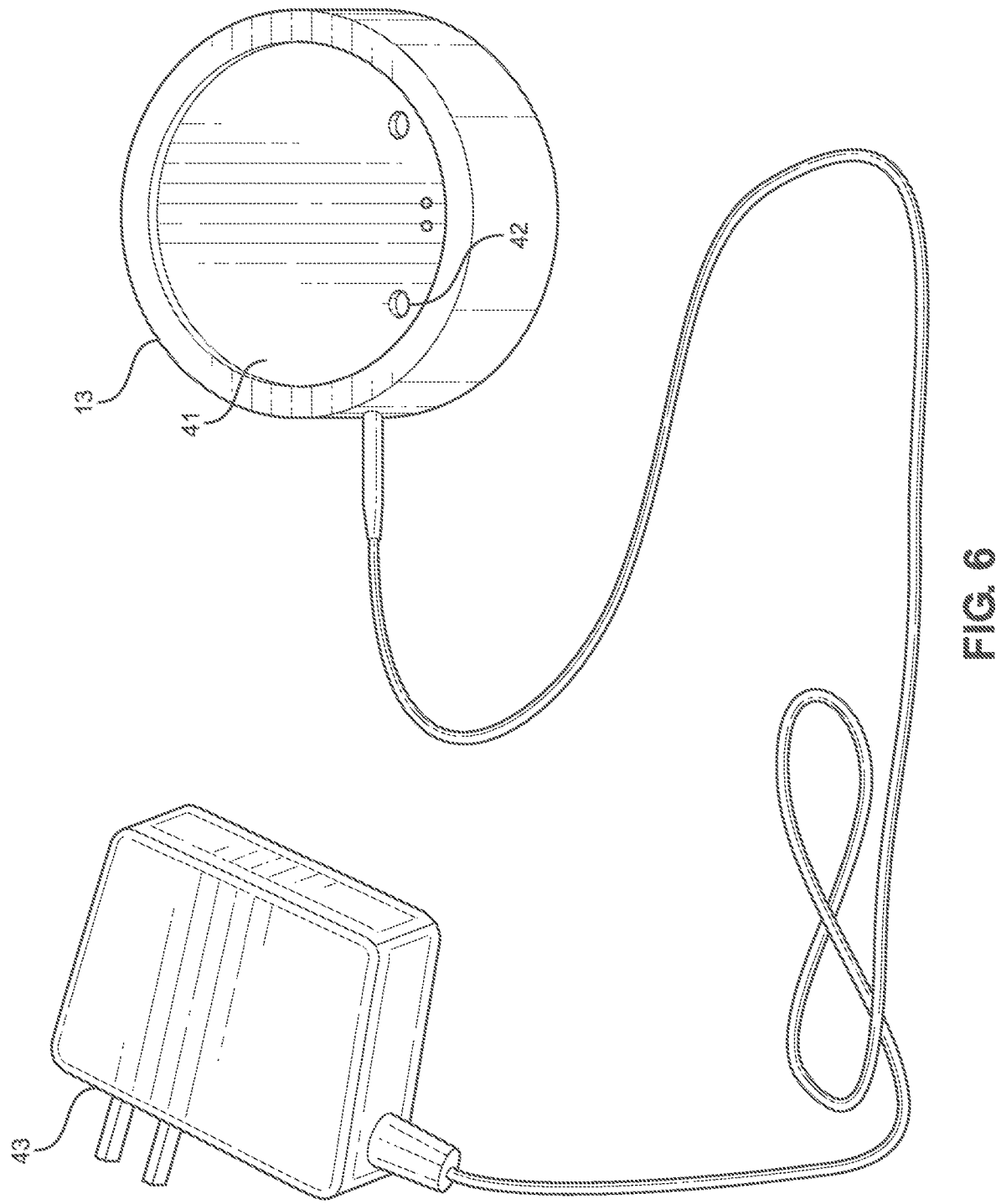
FIG. 6 shows a perspective view of a heating plate of an alternate embodiment of the heating device.

Referring now to FIG. 6, there is shown a perspective view of a heating plate of an alternate embodiment of the heating device. In the illustrated embodiment, the plate 13 further comprises a depression 41 therein, the depression 41 dimensioned to receive a base of the spray bottle therein. A first contact 42 is disposed within the depression 41, wherein the first contact 42 is in electrical communication with the power source 43. The first contact 42 is configured to provide power to the heating element when engaged with a second contact (as shown in FIG. 5, 44). In this way, the heating element is activated when the spray bottle is inserted into the depression 41. In the illustrated embodiment, the power source 43 comprises a converter configured to be inserted into a power outlet, however other power sources 43 are contemplated. In the illustrated embodiment, a wire connects the power source 43 to the plate 13, wherein in some embodiments, the wire is removably securable to the plate 13. In this way, the user can easily insert the plate 13 within the plurality of openings of the housing, and feed the wire into the plate 13 through the housing 12 to provide power thereto.

Figure 7:
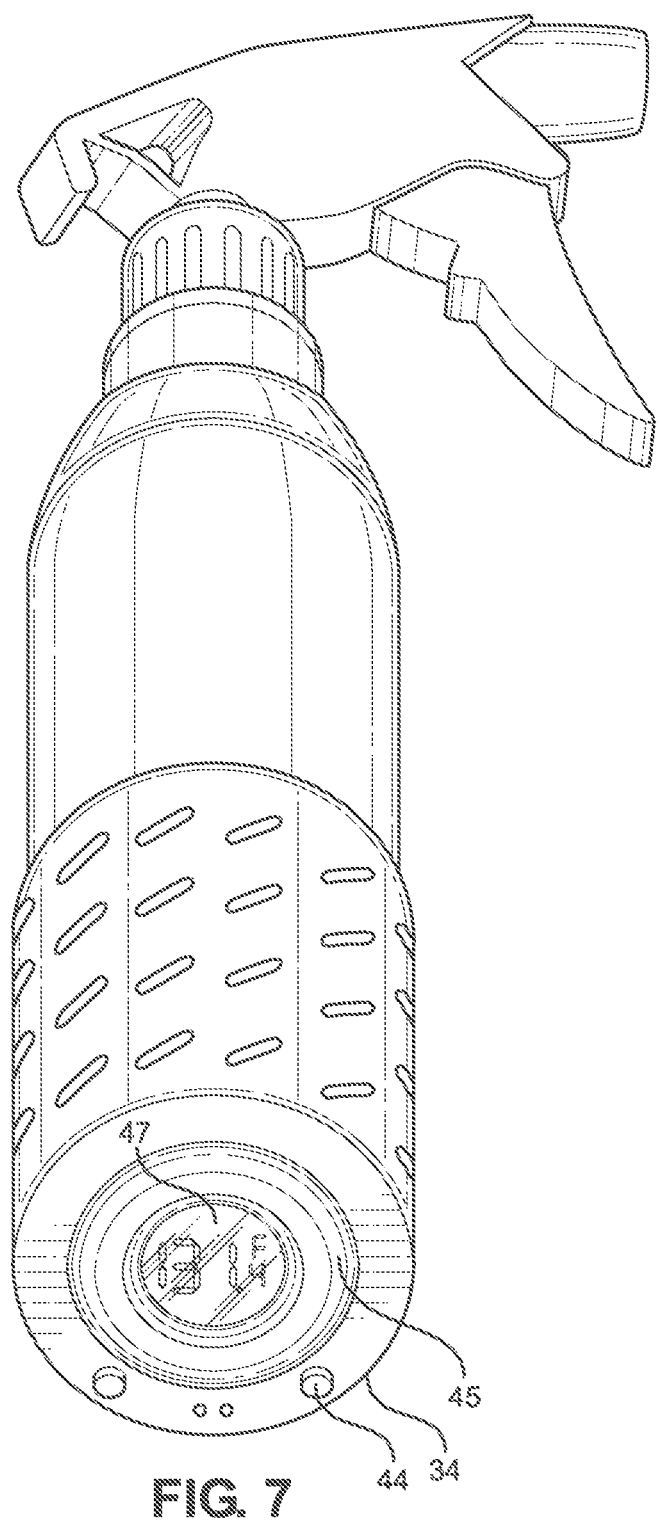
FIG. 7 shows a perspective view of a lower side of a spray bottle of an alternate embodiment of the heating device.

Referring now to FIG. 7, there is shown a perspective view of a lower side of a spray bottle of an alternate embodiment of the heating device. In the illustrated embodiment, the base 34 of the spray bottle further comprises the second contact 44 disposed on a lower surface 45 of the base 34, wherein the second contact 44 is configured to provide power to the heating element when the second contact 44 is engaged with the first contact. In some embodiments, the second contact 44 is magnetically biased towards the first contact, such that the pair of contacts are attracted to each other when in close proximity. In this way, the user can ensure that once the base 34 of the bottle is seated in the depression of the plate, the heating element will continuously receive power. In some embodiments, the heating element further comprises a control circuit configured to prevent heating the interior of the bottle beyond a threshold temperature.

In the illustrated embodiment, the base 34 further comprises a display 47 thereon, wherein the display 47 is operably connected to a temperature sensor disposed within the interior volume of the bottle, the temperature sensor configured to detect the temperature of the liquid disposed within the spray bottle. The temperature of the liquid within the spray bottle is then shown on the display 47 such that a user can easily determine if the liquid has reached a desired temperature.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A heating device for spray bottles in combination with a spray bottle, comprising:
    a housing having at least one opening configured to removably receive a plate therein,
        wherein the plate comprises a depression having at least one first contact therein;
    wherein the opening provides access to an interior of the housing;
    wherein the plate is in electrical communication with a power source via a wire operably connected to the plate;
    a spray bottle having an interior volume in fluid communication with a spray nozzle, wherein the spray bottle further comprises a base adapted for placement within the depression;
    wherein a heating element is disposed within the base, the heating element further comprising a second contact disposed on a lower surface of the base, wherein the heating element is configured to activate when the first contact engages the second contact;
    wherein the heating element is configured to transfer heat into the interior volume when active; and
    wherein the housing further comprises one or more storage containers therein;
    wherein the one or more storage containers are in communication with an interior of the housing;
    whereupon securement of the plate within the opening, the wire passes through the opening and into an interior of the one or more storage containers.

2. The heating device for spray bottles in combination with a spray bottle of claim 1, wherein the base further comprises a thermally conductive coating between the heating element and the interior volume, the thermally conductive coating configured to transfer heat into the interior volume.

3. The heating device for spray bottles in combination with a spray bottle of claim 1, wherein the depression is dimensioned to match a surface area of the base.

4. The heating device for spray bottles in combination with a spray bottle of claim 1, wherein the first contact and the second contact are configured to magnetically engage each other.

5. The heating device for spray bottles in combination with a spray bottle of claim 1, wherein the depression comprises a circular configuration.

6. The heating device for spray bottles in combination with a spray bottle of claim 1, wherein the one or more storage containers resemble a drawer, wherein the one or more storage containers is slidably positioned within the housing, such that the storage container is movable between an extended position and a retracted position.

7. The heating device for spray bottles in combination with a spray bottle of claim 6, wherein the storage container is configured to extend from a front end of the housing.

8. The heating device for spray bottles in combination with a spray bottle of claim 6, wherein a front wall of the storage container further comprises at least one aperture therein, wherein the aperture is configured to receive a finger therethrough.

9. The heating device for spray bottles in combination with a spray bottle of claim 1, wherein the spray bottle further comprises a temperature sensor therein, the temperature sensor operably connected to a display disposed on a lower surface of the base, wherein the lower surface is disposed substantially perpendicular to a sidewall of the spray bottle, such that the display is configured to display a temperature of the interior volume thereon.

10. The heating device for spray bottles in combination with a spray bottle of claim 9, wherein the display comprises a digital temperature display.

11. The heating device for spray bottles in combination with a spray bottle of claim 1, wherein the housing comprises a plurality of openings disposed in a linear arrangement along a longitudinal axis of the housing.

12. The heating device for spray bottles in combination with a spray bottle of claim 1, wherein a front wall of the storage container rests flush with a front side of the housing when the storage container is in a retracted position.

13. The heating device for spray bottles in combination with a spray bottle of claim 1, wherein the heating element further comprises a control circuit configured to deactivate the heating element when the interior volume has reached a threshold temperature.

14. The heating device for spray bottles in combination with a spray bottle of claim 1, further comprising a lip extending annularly inwardly from at least one opening, wherein the lip is configured to receive a lower end of each plate thereon.

15. The heating device for spray bottles in combination with a spray bottle of claim 1, wherein the base comprises a sidewall extending along a length of the spray bottle about a circumference thereof.

\* \* \* \* \*